United States Patent
Sato et al.

(10) Patent No.: US 7,509,878 B2
(45) Date of Patent: Mar. 31, 2009

(54) ULTRASONIC CAVITATING APPARATUS AND ULTRASONIC DOPPLER FLOW MEASUREMENT SYSTEM

(75) Inventors: Michio Sato, Yokosuka (JP); Tadashi Narabayashi, Yokohama (JP); Michitsugu Mori, Chiyoda-Ku (JP); Kenichi Tezuka, Chiyoda-Ku (JP); Hideaki Tezuka, Chiyoda-Ku (JP)

(73) Assignees: Kabushiki Kaisha Toshiba, Tokyo (JP); Tokyo Electric Power Co. Inc., Tokyo-To (JP)

( * ) Notice: Subject to any disclaimer, the term of this patent is extended or adjusted under 35 U.S.C. 154(b) by 596 days.

(21) Appl. No.: 11/148,308

(22) Filed: Jun. 9, 2005

(65) Prior Publication Data

US 2006/0079815 A1   Apr. 13, 2006

(30) Foreign Application Priority Data

Jun. 10, 2004   (JP) .............................. 2004-173071

(51) Int. Cl.
  *G01F 1/66*   (2006.01)
  *A61B 8/00*   (2006.01)

(52) U.S. Cl. ................. 73/861.25; 73/861.27; 600/439; 601/2

(58) Field of Classification Search .............. 73/861.25, 73/861.27
See application file for complete search history.

(56) References Cited

U.S. PATENT DOCUMENTS 3,751,992 A * 8/1973 Morgan .................... 73/863.83
5,984,578 A * 11/1999 Hanesian et al. ......... 405/128.2
6,880,402 B1 * 4/2005 Couet et al. ................... 73/579
6,886,406 B1 * 5/2005 Couet et al. ................... 73/579
7,290,450 B2 * 11/2007 Brown et al. .................. 73/579

FOREIGN PATENT DOCUMENTS

JP    6-294670    10/1994
JP    6-294671    10/1994

* cited by examiner

*Primary Examiner*—Harshad Patel
(74) *Attorney, Agent, or Firm*—Oblon, Spivak, McClelland, Maier & Neustadt, P.C.

(57) ABSTRACT

Disclosed is an ultrasonic Doppler flow measurment system that achieves flow measurement regardless of the temperature of a fluid. A temperature sensor 7 is combined with a pipe 1 to measure the temperature of a fluid 2. A controller 9 calculates a frequency that will cause cavitation when an ultrasonic transducer 4 exerts an ultrasonic vibration on the fluid 2 on the basis of a temperature measured by the temperature sensor 7 and controls a sinusoidal oscillator 6.

13 Claims, 8 Drawing Sheets

ULTRASONIC CAVITATING APPARATUS AND ULTRASONIC DOPPLER FLOW MEASUREMENT SYSTEM

BACKGROUND OF THE INVENTION

1. Field of the Invention

The present invention relates to an ultrasonic cavitating apparatus for causing cavitation in a fluid flowing through a pipe, and an ultrasonic Doppler flow measurement system employing the ultrasonic cavitating apparatus.

2. Description of the Related Art

A generally used ultrasonic flow measuring method of measuring the flow rate of a fluid flowing through a pipe uses, for example, propagation time difference method as mentioned in "Cho-Ompa Gijutu Binran (p. 746)", Saneyoshi et al., The Nikkan Kogyo Shimbun Ltd. However, when the inner surface of the pipe has a high surface roughness or when the inner surface of the pipe is covered with a cladding of, for example, rust, the accuracy of measurement by the above method lowers depending on the sectional area of a part having a high surface roughness or the cladding.

A measurement system developed to solve such a problem and applied to practical use is designed to improve accuracy by multiplying a measured flow velocity by a profile factor. Such a system is mentioned in "Calibration for Beaver Valley Unit 2 LEFM CheckPlus System® (2000) published in the Web site of Caldon Inc., USA. However, since the profile factor changes when the thickness of the cladding changes in a long time of use, measuring accuracy lowers accordingly.

To solve such a problem, flow measurement systems that measure the flow rate of a fluid based on the Doppler shift of ultrasonic wave have been proposed. Such systems are mentioned in JP6-294670A, and "Development of Flow Rate Measurements Using Ultrasonic Velocity Profile Method (11)", Otsukasa et al., Preliminary Papers, H13, for 2002 Annual Meeting (Spring) of Atomic Energy Society of Japan (Mar. 27-29, 2002).

The flow measuring method using Doppler shift analysis is based on the fact that the frequency of an echo reflected from minute ultrasonic reflectors existing in a fluid varies depending on the flow velocity of the fluid, which fact can be expressed by the following well-known Expression (1).

$$f = \frac{c-v}{c+v} f_0 \qquad (1)$$

where f is the frequency of the reflected echo, v is the flow velocity of the fluid, c is sound velocity (m/s) in the fluid, and $f_0$ (Hz) is the frequency of the ultrasonic wave emitted toward the minute reflectors.

The ultrasonic Doppler flow measurement system is capable of measuring the distribution of flow velocity of a fluid and does not use the profile factor which is used by the propagation time difference method. Therefore, the ultrasonic Doppler flow measurement system is able to achieve accurate flow measurement without being affected by the surface roughness of the inner surface of a pipe or cladding coating the inner surface of a pipe.

An ultrasonic Doppler flow measurement system disclosed in JP6-294670A generates an ultrasonic wave in a pipe by an ultrasonic radiator to cause cavitation, and generates ultrasonic pulses in the pipe by an ultrasonic transducer attached obliquely to the pipe. The ultrasonic pulse is reflected by bubbles produced by cavitation. The frequency of the reflected pulses is compared with that of the generated ultrasonic pulses. The flow velocity v of the fluid can be calculated by using Expression (1).

Sound velocity in a liquid is dependent on the temperature of the liquid. Therefore, condition for cavitation is dependent on the temperature of the liquid. The ultrasonic Doppler flow measurement system disclosed in JP6-294670A does not have any function to adjust parameters, such as the frequency of the ultrasonic wave, in response to the change in the liquid temperature. Therefore, cavitation caused at a temperature disappears when the temperature changes.

SUMMARY OF THE INVENTION

The present invention has been made to solve the foregoing problem and it is therefore an object of the present invention to provide an ultrasonic cavitating apparatus capable of causing cavitation in a liquid always under an optimum condition regardless of the temperature of the liquid, and an ultrasonic Doppler flow measurement system using the ultrasonic cavitating apparatus.

In order to achieve the above objectives, the present invention provides an ultrasonic cavitating apparatus, which includes: at least one cavitating ultrasonic transducer adapted to apply ultrasonic vibrations to a fluid flowing through a pipe to cause cavitation in the fluid; at least one variable-frequency ultrasonic oscillator adapted to apply an electric power to the ultrasonic transducer to drive the same; a temperature sensor adapted to measure a temperature of the fluid flowing through the pipe; and a controller configured to determine a frequency suitable for causing cavitation in the fluid flowing through the pipe based on the temperature measured by the temperature sensor, and configured to control the ultrasonic oscillator for driving the cavitating ultrasonic transducer so as to generate an ultrasonic vibration of the frequency suitable for causing cavitation.

The present invention also provides an ultrasonic Doppler flow measurement system capable of measuring a flow velocity (specifically, a flow velocity distribution) of a fluid flowing through a pipe. The system includes the aforementioned ultrasonic cavitating apparatus. The system further includes a Doppler flowmeter adapted to emit an ultrasonic wave to bubbles which are generated, by the ultrasonic cavitating apparatus, in the fluid flowing through the pipe, and configured to determine a flow velocity of the fluid based on a Doppler shift of the ultrasonic wave reflected by the bubbles.

According to the present invention, the controller determines the frequency suitable of causing cavitation in the fluid flowing through the pipe on the basis of the temperature measured by the temperature sensor, and controls the ultrasonic oscillator for driving the ultrasonic transducer so as to generate an ultrasonic vibration of the determined frequency. Therefore, cavitation can be surely caused in the fluid even if the temperature of the fluid changes.

The ultrasonic Doppler flow measurement system is capable of surely achieving Doppler flow measurement by generating bubbles which serve as ultrasonic reflectors by the ultrasonic cavitating apparatus even if the temperature of the fluid changes.

The above and other objects, features and advantages of the present invention will become apparent from the following description taken in connection with the accompanying drawings.

DESCRIPTION OF THE PREFERRED EMBODIMENTS

First Embodiment

Figure 1:
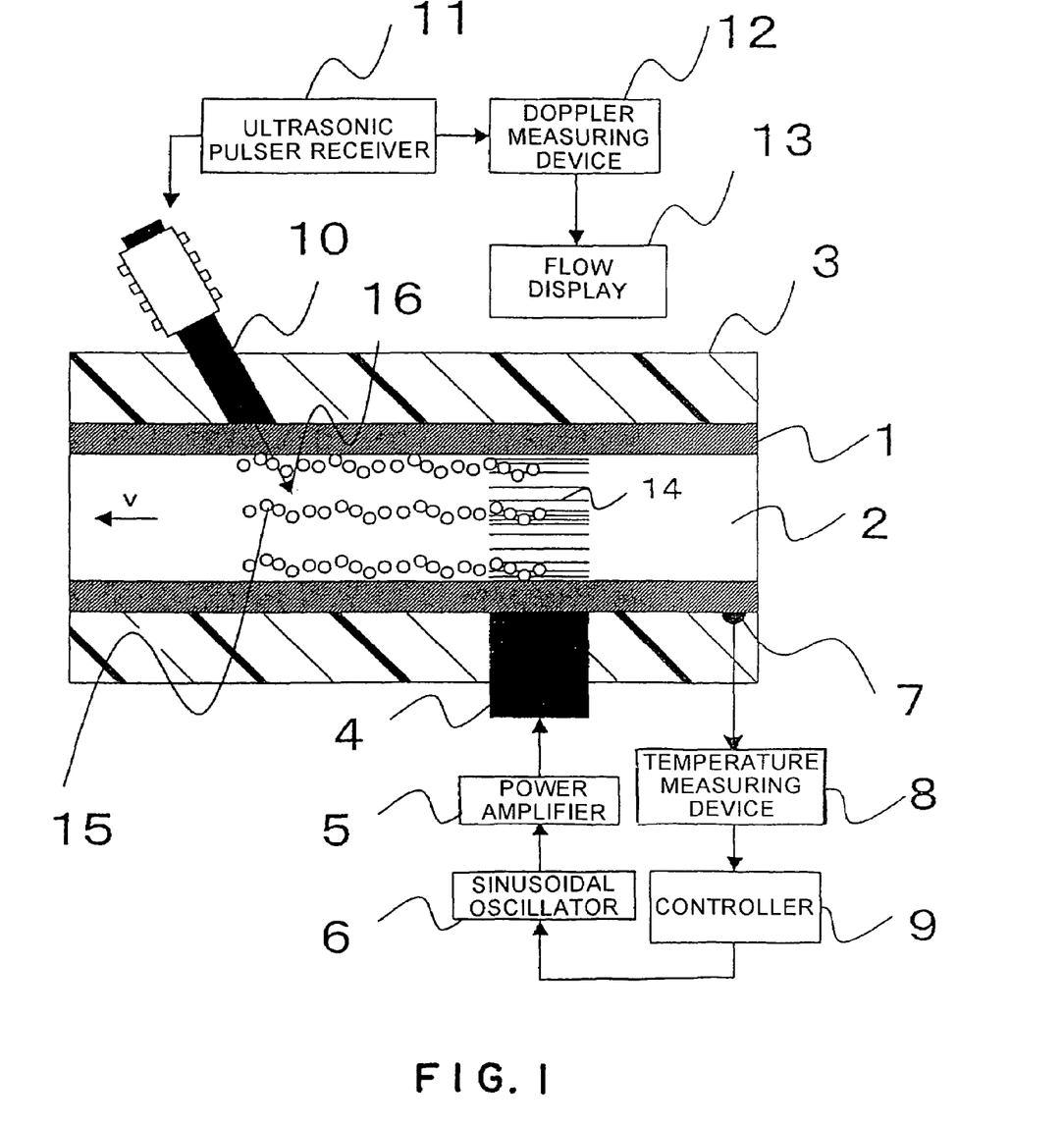
FIG. 1 is a block diagram of an ultrasonic flow measurement system in a first embodiment according to the present invention.

FIG. 1 is a schematic cross-sectional view of an ultrasonic flow measurement system in a first embodiment according to the present invention. A high-temperature fluid 2 flows through a pipe 1. The pipe 1 is wrapped in a heat insulator 3. An ultrasonic transducer 4 for causing cavitation is mounted to the pipe 1. The ultrasonic transducer 4 is connected to a power amplifier 5. The power amplifier 5 is connected to a variable-frequency, sinusoidal wave oscillator 6. A temperature sensor 7 is attached to the pipe 1 to measure the temperature of the high-temperature fluid 2. The temperature sensor 7 is connected to a temperature measuring device 8, which is connected to a controller 9. The controller 9 is connected to the sinusoidal wave oscillator 6. The devices 4, 5, 6, 7, 8 and 9 constitute a cavitating section of the system.

An ultrasonic sensor 10 for flow measurement, or a measuring ultrasonic transducer, is attached to the pipe 1. Usually, the ultrasonic sensor 10 is formed as a unit having an electromechanical converter capable of converting electric signals into vibrations, such as a piezoelectric transducer, and a case encasing the electromechanical converter. The electromechanical converter is capable of converting an electric signal into a vibration and converting a vibration into an electric signal. The ultrasonic sensor 10 is connected to an ultrasonic pulser-receiver 11. The ultrasonic pulser-receiver 11 is connected to a Doppler measuring device 12. The Doppler measuring device 12 is connected to a flow display 13. The devices 10, 11, 12 and 13 constitute a measurement section of the system, or a Doppler flowmeter.

Figure 2:
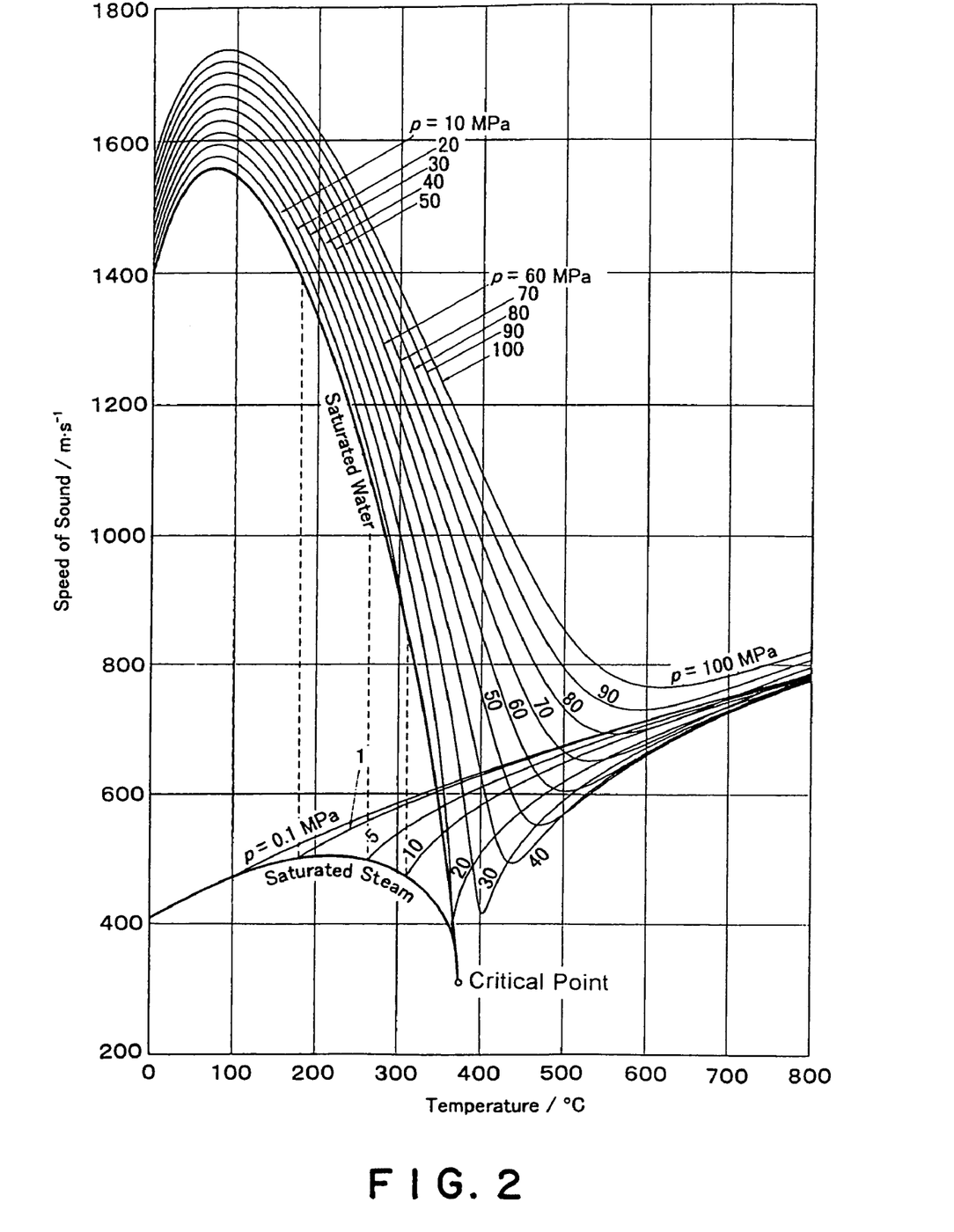
FIG. 2 is a graph showing the relation between temperature and sound velocity.

Suppose that the high-temperature fluid 2 is water. Then, sound velocity in water changes with temperature as shown in FIG. 2. A diagram shown in FIG. 2 is quoted from "Steam Table", The Japan Society of Mechanical Engineers (1999). The wavelength λ of an ultrasonic wave that propagates in water is expressed by Expression (2).

$$\lambda = \frac{v_T}{f} \quad (2)$$

where λ is the wavelength of the ultrasonic wave, $v_T$ (ms) is sound speed in water of T (° C.), and f (Hz) is the frequency of the ultrasonic wave.

A standing wave is produced in the pipe 1 at a certain frequency. A condition for producing a standing wave is expressed by Expression (3).

$$a = \frac{\lambda}{2} \quad (3)$$

where a (m) is the inside diameter of the pipe 1.

Expression (4) for calculating the frequency f is obtained by substituting Expression (3) into Expression (2).

$$f = \frac{v_T}{2a} \quad (4)$$

It is known from Expression (4) that the frequency at which a standing wave is produced changes with the change of sound velocity. The controller 9 monitors the temperature of the high-temperature fluid 2 in the pipe 1 in a real-time monitoring mode by using data provided by the temperature sensor 7 and the temperature measuring device 8. A function representing the temperature-sound velocity relation, which is an equivalent to that shown in FIG. 2, is stored in the controller 9. The controller 9 calculates a sound velocity in the high-temperature fluid 2 at a measured temperature by using the function. The controller 9 sets the frequency of oscillation of the sinusoidal oscillator 6 at a value calculated by using Expression (4) on the basis of the calculated sound speed to produce a standing wave. Thus, a standing wave can be produced in the pipe 1. Parts indicated by densely arranged lines of a standing wave 14 shown in FIG. 1 have a high sound pressure, and parts indicated by coarsely arranged lines of the standing wave 14 have a low sound pressure. A negative pressure is generated and continues for a sufficient time to cause cavitation at parts having a high sound pressure of the standing wave 14. Refer to "Hirogaru Shin-Oyou no Kaitaku, Yasashii Cho-ompa Kogaku, Enlarged edition", Kawabata Akira, Kogyo Chosakai Publishing Inc., for the further detail.

According to the above document (Kawabata), a condition for causing cavitation can be evaluated by using Expression (5).

$$I = \frac{p^2}{z_0} \quad (5)$$

where I (W/m$^2$) is power density of the ultrasonic wave, p (Pa) is the sound pressure of the ultrasonic wave, and $z_0$ (kg/m$^2$·s) is the acoustic impedance of water.

Necessary power P (W) is calculated by using Expression (6).

$$P = I \times S \quad (6)$$

where S (m$^2$) is the area of the ultrasonic transducer.

If the diameter of the ultrasonic transducer is 50 mm, necessary power P is 10 kW. Thus the ultrasonic transducer needs considerably high power.

Referring to FIG. 1, the bubbles 15 formed by cavitation move in the pipe 1 at a velocity v (m/s) equal to the flow velocity of the fluid. The ultrasonic pulser-receiver 11 supplies a pulse voltage to the ultrasonic sensor 10 for flow measurement, so that the ultrasonic sensor 10 generates an ultrasonic wave 16. The ultrasonic wave 16 propagates in the pipe and collides with the bubbles 15. Since the bubbles 15 are small vacuum spaces or small globules of gas, the ultrasonic wave 16 is reflected completely by the bubbles 15. The reflected ultrasonic wave falls on the ultrasonic sensor 10. The ultrasonic pulser-receiver 11 receives and processes a signal provided by the ultrasonic sensor 10, and gives a processed signal to the Doppler measuring device 12.

The reflected ultrasonic wave has a Doppler shift because the bubbles 15 are moving, and thus the frequency of the reflected ultrasonic wave is different from that of the emitted ultrasonic wave 16. The frequency f (Hz) of the reflected ultrasonic wave can be calculated by using Expression (1). The moving velocity v (m/s) of the bubbles 15 can be calculated by using Expression (7) obtained by changing Expression (1).

$$v = \frac{v_T}{2}\left(1 - \frac{f}{f_0}\right) \quad (7)$$

Thus the flow velocity of the fluid equal to the moving velocity of the bubbles 15 can be determined by calculating the ratio of the frequency of the reflected ultrasonic wave to that of the emitted ultrasonic wave 16. Note that it is supposed that "$v/v_T \ll 1$" in making Expression (7).

The Doppler measuring device 12 carries out the foregoing processes and measurements, and the measurement results are displayed by the flow display 13. There are not any restrictions on the measurement of the Doppler shift. The Doppler shift may be calculated by fast Fourier transform (FFT).

The reflection of the ultrasonic wave occurs in regions in which the bubbles 15 due to the cavitation are formed. Therefore, if the bubbles 15 are distributed in areas near the inner surface of the pipe 1, the reflected ultrasonic wave is received in a form of a comparatively long pulse train. The pulse train is divided into time divisions, frequency changes in the respective time divisions are measured, and flow velocities respectively corresponding to the time divisions are determined. Thereby, the flow velocity distribution (velocity profile) of the high-temperature fluid can be determined. If the temperature of the fluid 2 varies, the sound velocity in the fluid 2 is calculated on the basis of the measured temperature of the fluid 2, the frequency at which the standing wave is generated is calculated, and the ultrasonic transducer 4 for causing cavitation generates ultrasonic wave of the calculated frequency. Thus the flow velocity distribution of the fluid can be accurately determined even if the temperature of the fluid varies.

It is preferable to reduce the pitch of the peaks of the standing wave by changing the frequency of the sinusoidal oscillator 6. Expression (3) expresses a condition for generating a basic (primary) standing wave. Since a higher-order standing wave can be generated when the inside diameter a (m) of the pipe 1 is n times the frequency of half wavelength (n is a natural number), a condition for generating a higher-order standing wave can be expressed by Expression (8) obtained by changing Expression (3).

$$a = n\frac{\lambda}{2} \quad (8)$$

According to description in "Cho-Ompa Gijutu Binran (p. 20)", Saneyoshi et al., The Nikkan Kogyo Shimbun Ltd., sound pressure p in the pipe 1 can be calculated by using the following expressions.

$$p = A\cos(kx), \; k = \frac{2\pi}{\lambda} \quad (9)$$
$$p = A\cos\left(\frac{2\pi}{\lambda}x\right)$$
$$p = A\cos\left\{n\pi\left(\frac{x}{a}\right)\right\}$$

where A is a constant and x is a position with respect to a direction along the diameter of the pipe.

Figure 3:
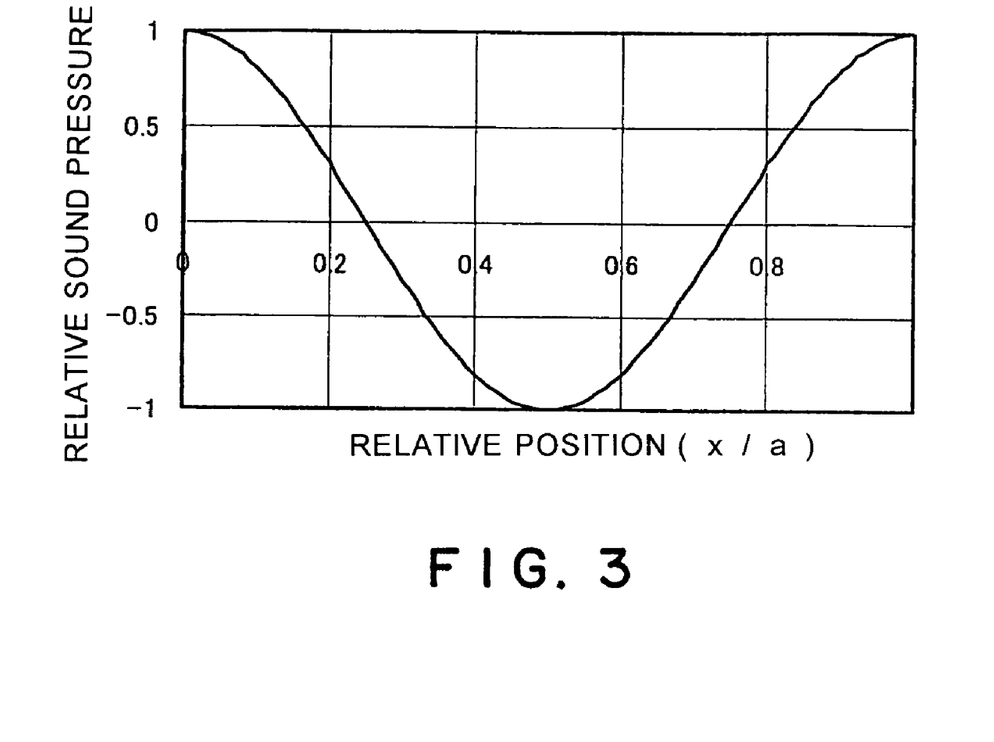
FIG. 3 is a graph typically showing sound pressure distribution in a fluid when a primary standing wave is generated.
Figure 4:
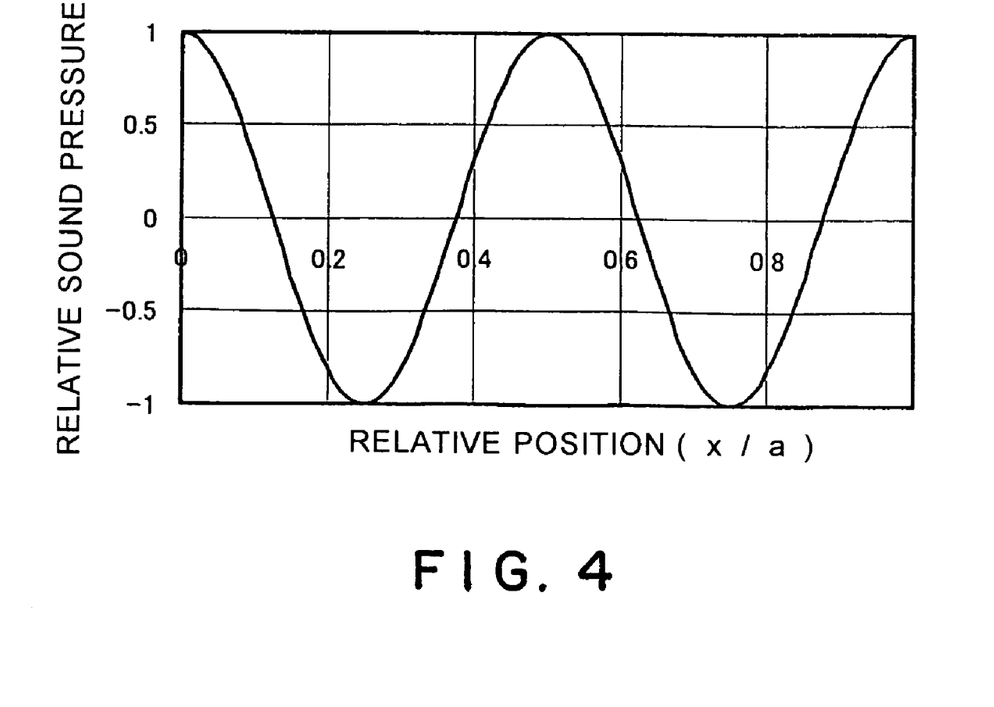
FIG. 4 is a graph typically showing sound pressure distribution in a fluid when a standing wave of a frequency three times the frequency of the primary standing wave is generated.

FIGS. 3 and 4 show calculated values of p/A of Expression (7) respectively for n=2 and n=4. When n is large, i.e., when the frequency is high, the number of positions at x where sound pressure reaches a peak increases and hence cavitation can be caused in a wide range. Whereas cavitation occurs at three positions in FIG. 3, cavitation occurs at five positions in FIG. 4 where the frequency is twice the frequency in FIG. 3.

Second Embodiment

Figure 5:
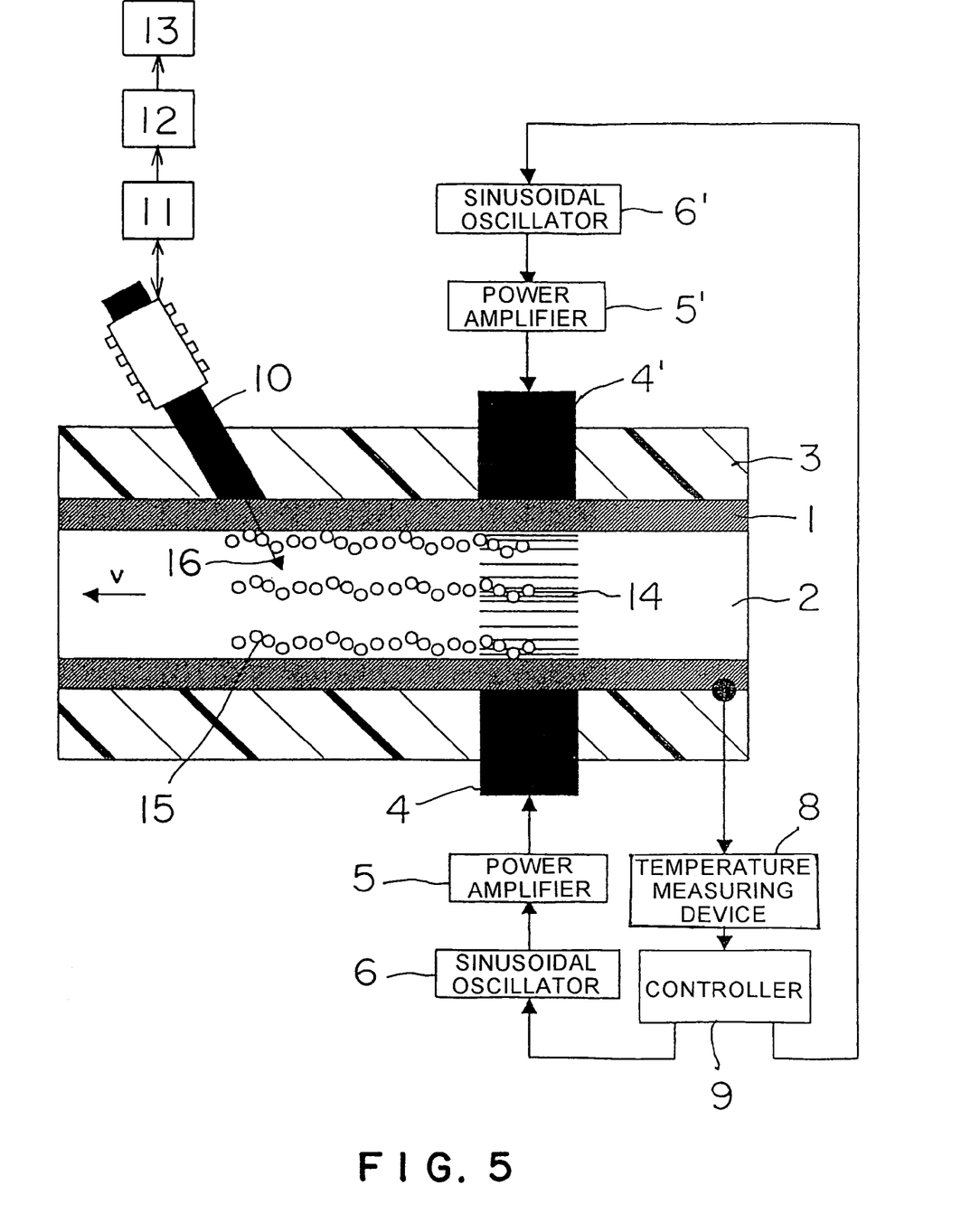
FIG. 5 is a block diagram of an ultrasonic flow measurement system in a second embodiment according to the present invention.

FIG. 5 is a view of a second embodiment according to the present invention. The embodiment shown in FIG. 5 differs from the embodiment shown in FIG. 1 in the increased number of ultrasonic transducers for causing cavitation.

As shown in FIG. 5, an additional ultrasonic transducer 4' is arranged such that the ultrasonic transducers 4 and 4' are disposed diametrically opposite to each other on a pipe 1. The ultrasonic transducer 4' is connected to a power amplifier 5'. The power amplifier 5' is connected to a sinusoidal oscillator 6'. The sinusoidal oscillator 6' is also connected to the controller 9. In this embodiment, the controller 9 controls the sinusoidal oscillators 6 and 6' on the basis of measured data provided by a temperature sensor 7 and a temperature measuring device 8 so that the ultrasonic oscillators 6 and 6' generate signals of different frequencies, respectively, to generate a standing wave in a fluid 2 in the pipe 1.

When a frequency as high as an odd number times a frequency applied to the ultrasonic transducer 4 is applied to the ultrasonic transducer 4', sound pressure distribution in the pipe is expressed by Expression (10).

$$p = A\cos\left\{n\pi\left(\frac{x}{a}\right)\right\} + A\cos\left\{m\pi\left(\frac{x}{a}\right)\right\} \quad (10)$$

$$m = (2i+1)n \quad i = 1, 2, 3, \ldots$$

Figure 6:
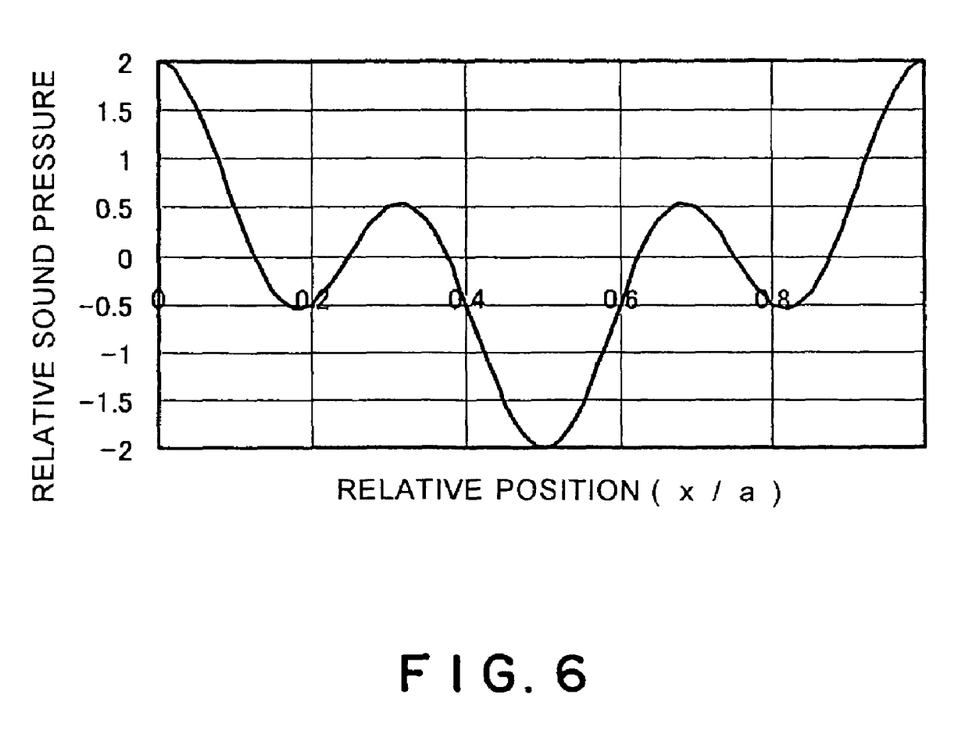
FIG. 6 is a graph typically showing sound pressure distribution in a fluid when a primary standing wave and a standing wave of a frequency three times the frequency of the primary standing wave are generated simultaneously.

It is known from Expression (10), the sound pressure in the pipe is the sum of sound pressures generated by the two ultrasonic transducers 4 and 4'. FIG. 6 shows data calculated by using Expression (10) for n=2 and m=6. Maximum sound pressure appears at positions near the wall of the pipe 1 and a position in a central part of the pipe, and the maximum sound pressure level is doubled as compared with the cases shown in FIGS. 3 and 4. Thus, flow velocity distribution in a central part of the flow can be accurately measured. When cavitation caused by a single ultrasonic transducer is insufficient, this arrangement can cause greater cavitation.

Third Embodiment

Figure 7:
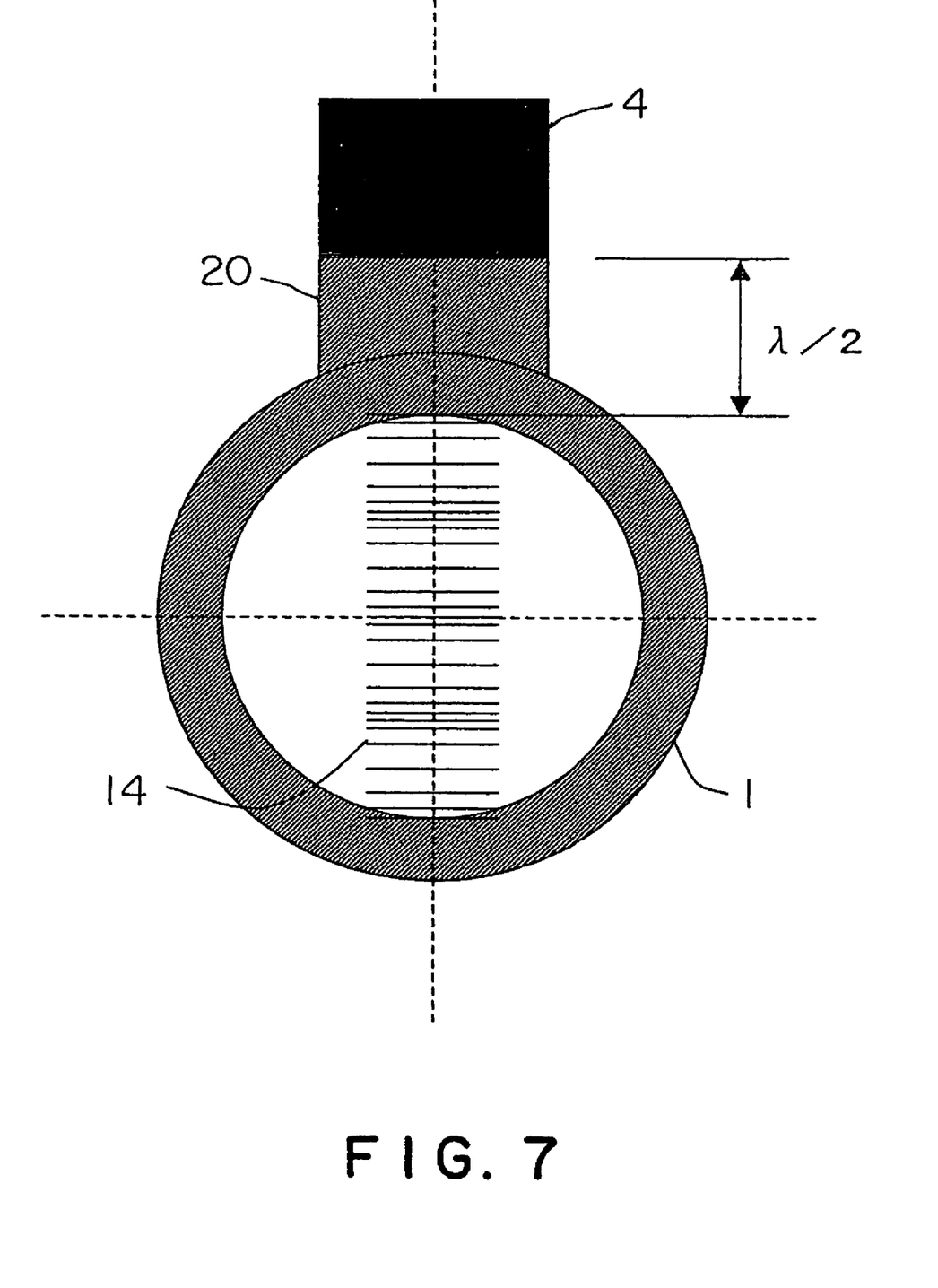
FIG. 7 is a schematic cross-sectional view of assistance in explaining transmitting an ultrasonic wave in the pipe by using a delaying material, in relation to an ultrasonic flow measurement system in a third embodiment according to the present invention.

FIG. 7 shows a third embodiment according to the present invention. The embodiment shown in FIG. 7 differs from the embodiment shown in FIG. 1 only in that an ultrasonic delaying material 20, which is made of a material identical to that of the pipe 1, is interposed between an ultrasonic transducer 4 for causing cavitation and the outer surface of the pipe 1. Thus, the energy of an ultrasonic wave can be efficiently transmitted to a fluid through a complex resonance generated between the delaying member 20 and the wall of the pipe 1. According to "Cho-Ompa Gijutu Binran", Saneyoshi et al., The Nikkan Kogyo Shimbun Ltd., transmittance is improved when the thickness of the delaying material 20 is equal to an odd number times the half wavelength of the ultrasonic wave. In the second embodiment shown in FIG. 5, ultrasonic delaying material 20 may be combined with the two ultrasonic transducers 4 and 4', respectively, to enhance the sound pressure of the ultrasonic wave in the fluid and to facilitate causing cavitation.

Fourth Embodiment

Figure 8:
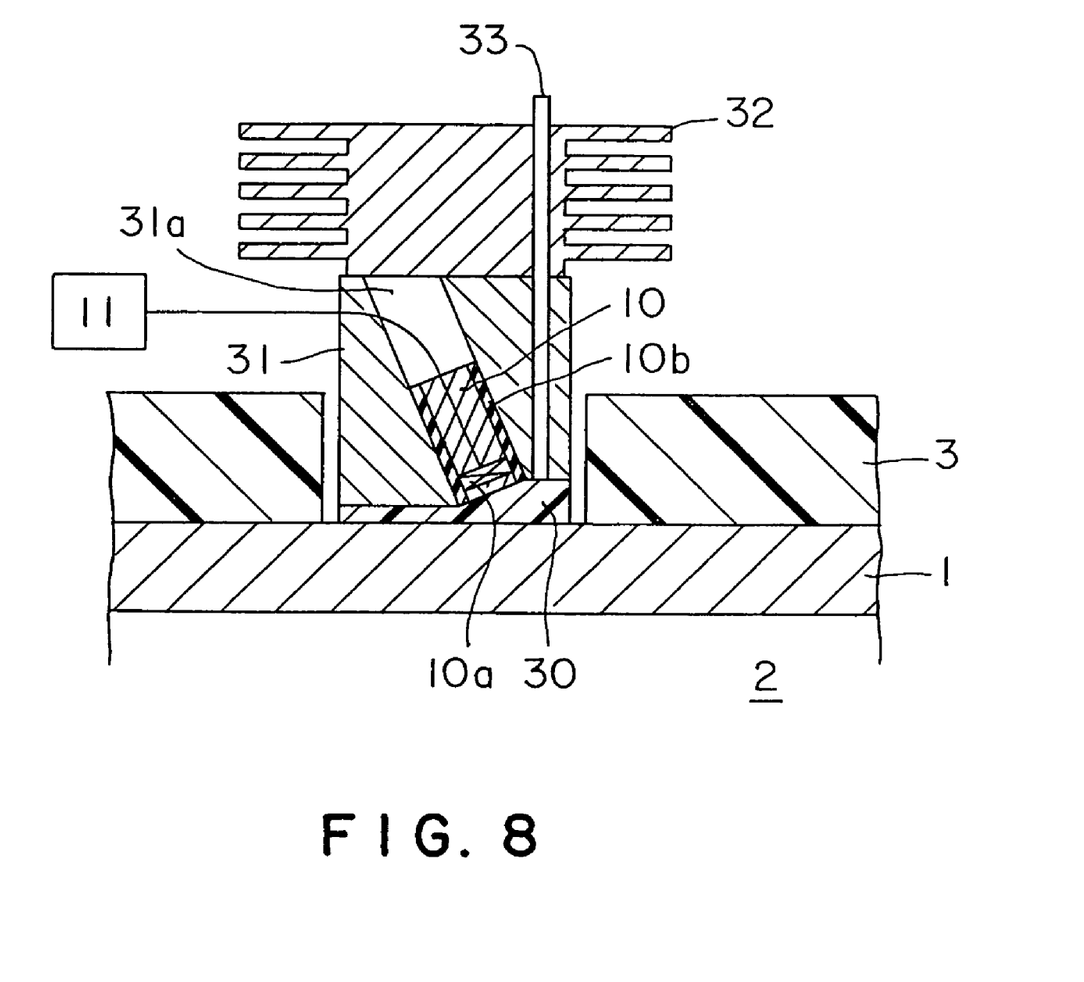
FIG. 8 is a typical fragmentary sectional view showing a heat insulating and dissipating arrangement for a measuring ultrasonic transducer included in an ultrasonic flow measurement system in a fourth embodiment according to the present invention.

A fourth embodiment according to the present invention will be described. Usually, an ultrasonic sensor 10 formed in a unit is provided at the distal end thereof with an electric-vibration converter 10a, such as a piezoelectric vibrator. This embodiment relates to a heat insulating or heat radiating means for preventing the rise of the temperature of the converter.

As shown in FIG. 8, the ultrasonic sensor 10 for flow measurement is connected to a part of a pipe 1 exposed by partially removing a heat insulating material 3 covering the pipe 1. A heat-resistant resin shoe 30 is interposed between the surface of the pipe 1 and the distal end of the ultrasonic sensor 10. The heat-resistant shoe 30 is formed of a resin having a thermal conductivity far less than those of metals and an excellent ultrasonic wave propagating characteristics, such as a polyimide resin or a polycarbonate resin. The heat-resistant shoe 30 thus reduces heat transfer from the surface of the pipe 1 to the converter 10a of the ultrasonic sensor 10 to prevent the rise of the temperature of the converter 10a. The ultrasonic sensor 10 is inserted in a bore 31a formed in a metal bar 31 having a high thermal conductivity. Preferably, the metal bar 31 is formed of aluminum or copper. Radiation fins 32 are attached to a part, not covered with the heat-insulating material 3, of the metal bar 31.

Preferably, the metal bar 31 is internally provided with a heat pipe 33 for the further efficient heat radiation. A suitable working medium for the heat pipe 33 is chlorofluorocarbon or water, which has a boiling point 100° C. or below, and thus efficient cooling can be achieved.

If it is preferable to thermally isolate the outer surface of the ultrasonic transducer 10 from the metal bar 31, a case 10b of the ultrasonic sensor 10 for flow measurement is formed of a heat-insulating resin, such as a polyimide resin or a polycarbonate resin. If it is preferable to enhance heat transfer from the metal bar 31 to the outside surface of the ultrasonic sensor 10, a space between the outside surface of the ultrasonic sensor 10 and the side surface of the bore 31a of the metal bar 31 may be filled up with a heat-conductive grease, such as a silicone grease.

Figure 9:
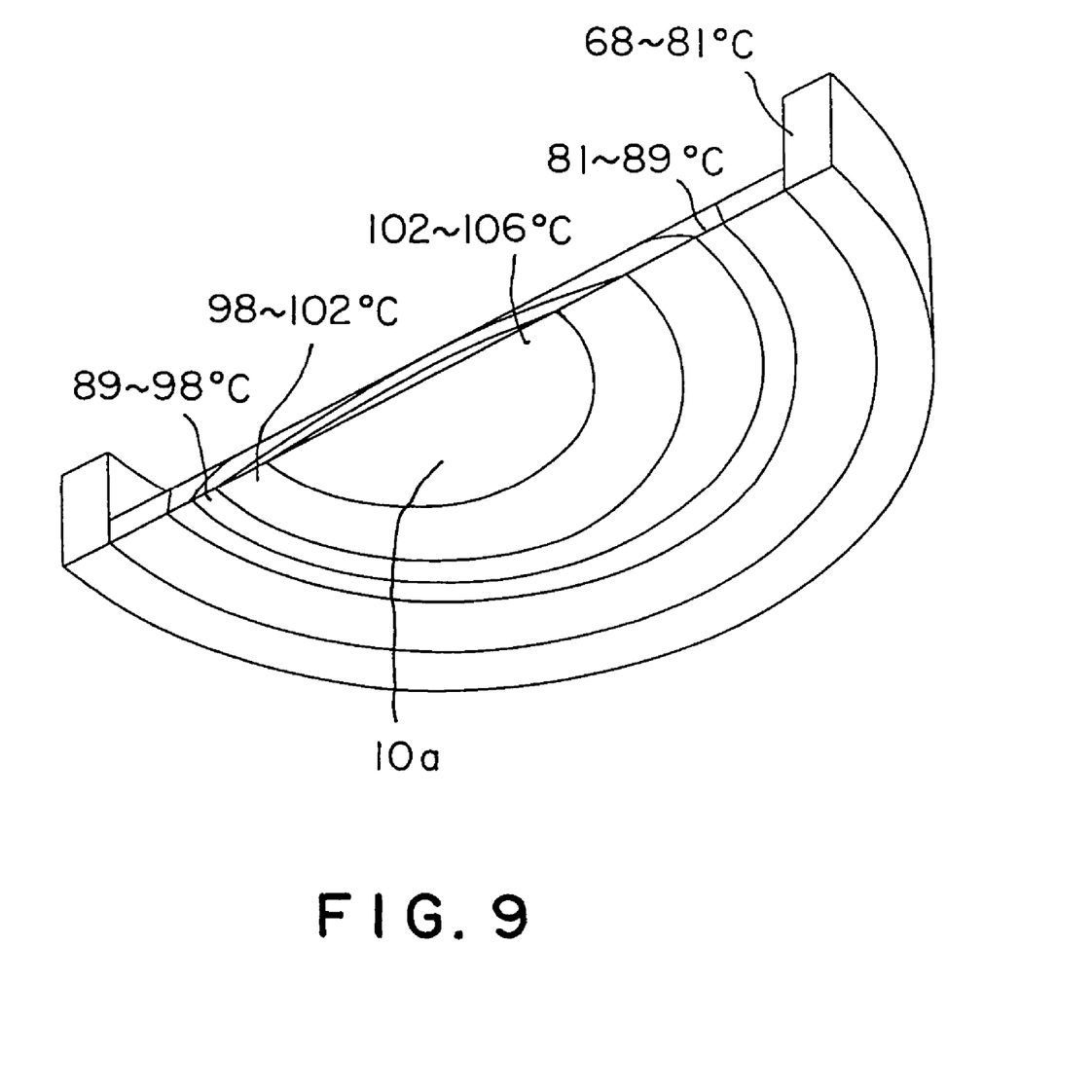
FIG. 9 is an enlarged temperature contour diagram showing the results of analysis by a three-dimensional finite element method, showing the functions and effects of the heat insulating and dissipating arrangement for the measuring ultrasonic transducer shown in FIG. 8.

FIG. 9 shows temperature distribution in the distal end portion of the ultrasonic sensor 10 disposed as shown in FIG. 8. The temperature distribution is calculated through the analysis of heat conduction using a finite element method (FEM) on an assumption that the temperature of the inner surface of the pipe is 230° C. (this is equal to feedwater temperature in a nuclear reactor). The calculated temperature at the center portion of the distal end of the ultrasonic sensor 10 was 106° C. This result shows that, according to the arrangement shown in FIG. 8, the electromechanical converter of the ultrasonic sensor 10 can be maintained at temperatures below a limit working temperature for commercially-available ultrasonic sensors for flow measurement, even if the fluid to be measured is feedwater of a high-temperature flowing through a pipe of a feedwater system for a nuclear reactor. This fact means that a high-sensitivity ultrasonic sensor for flow measurement can be used instead of a high-temperature rated ultrasonic sensor for flow measurement having a low sensitivity, and the effective measurement of the flow of feedwater supplied to a nuclear reactor can be achieved. The possibility of accurate measurement of the flow of feed water during constant operation at a rated output can increase the electrical output of a nuclear reactor about 2% at a maximum and its economic effect is very significant.

What is claimed is:

1. An ultrasonic cavitating apparatus comprising:
   at least one cavitating ultrasonic transducer configured to apply ultrasonic vibrations to a fluid flowing through a pipe to cause cavitation in the fluid;
   at least one variable-frequency ultrasonic oscillator configured to apply an electric power to the ultrasonic transducer to drive the same;
   a temperature sensor configured to measure a temperature of the fluid flowing through the pipe; and
   a controller configured to determine a frequency of the electric power ensuring generation of standing wave in the fluid flowing through the pipe, based on the temperature measured by the temperature sensor, according to a function stored in the controller, and configured to control the ultrasonic oscillator to apply the electric power of the determined frequency to the ultrasonic transducer.

2. The apparatus according to claim 1, wherein a pair of ultrasonic transducers, as said at least one ultrasonic transducer, are disposed diametrically opposite to each other on the pipe.

3. The apparatus according to claim 2, wherein a pair of ultrasonic oscillators, as said at least one ultrasonic oscillator, are connected respectively to the pair of ultrasonic transducers, whereby the frequencies of electric power applied to the ultrasonic transducers can be individually changed.

4. The apparatus according to claim 1, wherein an ultrasonic delaying material is interposed between the ultrasonic transducer and an outer surface of the pipe.

5. The apparatus according to claim 1, wherein a pair of ultrasonic transducers, as said at least one ultrasonic transducer, are disposed diametrically opposite to each other on the pipe, and an ultrasonic delaying material is interposed between each of the ultrasonic transducers and an outer surface of the pipe.

6. An ultrasonic Doppler flow measurement system for measuring a flow velocity of a fluid flowing through a pipe, said system comprising:
the ultrasonic cavitating apparatus according to claim 1; and
a Doppler flowmeter adapted to emit an ultrasonic wave to bubbles generated in the fluid flowing through the pipe due to the cavitation caused by the ultrasonic cavitating apparatus, and configured to determine a flow velocity of the fluid based on a Doppler shift of the ultrasonic wave reflected by the bubbles.

7. The system according to claim 6, wherein:
the Doppler flowmeter includes a measuring ultrasonic transducer adapted to emit the ultrasonic wave toward the bubbles, and/or adapted to receive the ultrasonic wave reflected by the bubbles;
a heat-insulating material is interposed between an end of the measuring ultrasonic transducer facing the pipe and an outer surface of the pipe; and
the measuring ultrasonic transducer is inserted in a bore formed in a metal bar having heat-radiating fins.

8. The system according to claim 7, wherein the metal bar is internally provided with a heat pipe.

9. The system according to claim 8, wherein the heat pipe uses chlorofluorocarbon or water as a working medium.

10. The system according to claim 7, wherein the heat insulating material is a polyimide resin.

11. The system according to claim 7, wherein the metal bar is formed of aluminum or copper.

12. The system according to claim 7, wherein the measuring ultrasonic transducer is held in a case formed of a polyimide resin.

13. The system according to claim 7, wherein a space between a surface of a case holding the measuring ultrasonic transducer and a surface of the bore of the metal bar is filled up with a silicone grease.

\* \* \* \* \*